United States Patent [19]
Joyce

[11] Patent Number: 4,793,305
[45] Date of Patent: Dec. 27, 1988

[54] HIGH TURBULENCE COMBUSTION CHAMBER FOR TURBOCHARGED LEAN BURN GASEOUS FUELED ENGINE

[75] Inventor: Robert S. Joyce, Droitwich Spa, United Kingdom

[73] Assignee: Dresser Industries, Inc., Dallas, Tex.

[21] Appl. No.: 74,522

[22] Filed: Jul. 16, 1987

[51] Int. Cl.⁴ ............................................. F02B 23/08
[52] U.S. Cl. ................................ 123/279; 123/260; 123/661
[58] Field of Search ............... 123/260, 279, 661, 667

[56] References Cited

U.S. PATENT DOCUMENTS

| | | | |
|---|---|---|---|
| 2,395,110 | 2/1946 | Forrest | 123/65 R |
| 2,644,433 | 7/1953 | Anderson | 123/27 R |
| 3,452,726 | 7/1969 | Szymanski | 123/260 |
| 3,924,580 | 12/1975 | Taira et al. | 123/307 |
| 3,965,872 | 6/1976 | Taira et al. | 123/269 |
| 4,023,541 | 5/1977 | Sakamoto et al. | 123/26 |
| 4,063,537 | 12/1977 | Lampredi | 123/307 |
| 4,292,937 | 10/1981 | Vallaude | 123/193 P |
| 4,294,207 | 10/1981 | May | 123/279 |
| 4,344,408 | 8/1982 | Inoue et al. | 123/279 |
| 4,453,513 | 6/1984 | Perrin et al. | 123/260 |
| 4,522,173 | 6/1985 | Agache | 123/276 |
| 4,538,566 | 9/1985 | Tsuruoka | 123/276 |
| 4,557,231 | 12/1985 | Thery | 123/667 |

FOREIGN PATENT DOCUMENTS

| | | | |
|---|---|---|---|
| 0111966 | 6/1984 | European Pat. Off. | 123/661 |
| 57-193717 | 11/1982 | Japan | 123/661 |

Primary Examiner—Andrew M. Dolinar
Attorney, Agent, or Firm—Sigalos, Levine & Montgomery

[57] ABSTRACT

Apparatus and method for improving the fuel economy and noxious emission levels of a gaseous fueled engine by the use of a combustion chamber in a flat topped piston which is smaller in area and deeper than the combustion chamber in a conventional piston. The chamber is offset from the central axis of the piston to cause the squish velocity of the combustion mixture to be high in the vicinity of an ignition device. Also, the chamber is non-circular in shape to create higher turbulence throughout the combustion region.

18 Claims, 2 Drawing Sheets

HIGH TURBULENCE COMBUSTION CHAMBER FOR TURBOCHARGED LEAN BURN GASEOUS FUELED ENGINE

BACKGROUND OF THE INVENTION

The present invention relates generally to the reduction of emissions and improving the fuel economy of gaseous fueled engines by leaning out the combustion mixture. In particular the invention relates to an improved combustion chamber in a flat top piston which is smaller in area and deeper than a combustion chamber in a conventional piston to create a greater squish area and hence the squish velocity which improves combustion. In addition, the chamber is offset from the central axis of the cylinder to cause the swirl velocity of the combustion mixture in the vicinity of an ignition device, such as a spark plug, to be high. Finally, the combustion chamber is made non-circular in shape without resorting to one or more baffles. The non-circular shape disturbs the orderly motion of the swirl of the combustion mixture, thereby creating additional eddies and higher turbulence throughout the combustion region.

The term "baffle" as used herein, has the meaning ascribed to it by Webster's Dictionary, edited by John G. Allee, Ph.D., and copyrighted by Ottenheimer Publishers, Inc. in 1978. That meaning is defined as follows: "A plate for regulating the flow of a liquid or gas." The term "baffleless" as used herein means without a baffle.

One of the methods used in gaseous fueled engines to simultaneously reduce unwanted emissions and improve fuel economy is to increase the proportion of air as compared to the fuel or, in other words, the combustion mixture is made "lean". In general, the leaner the mixture, the better the results. The degree to which the engine can be leaned out is limited, however, by two factors: (1) stability of combustion and (2) slow flame speed.

Both of these factors are improved by increasing the turbulence of the combustible mixture at the time of ignition and immediately thereafter. Turbulence throughout the combustion volume is important with turbulence near the spark plug being particularly important and beneficial. Thus it is important to maximize the turbulence in the vicinity of the spark plug.

In the typical prior art gaseous fueled engine, the piston has a flat top and a "combustion chamber", the latter being a depression in the piston top. At top dead center, the distance between the flat top of the piston and the flat surface of the cylinder head is quite small. During the compression stroke, the fuel/air mixture is forced out of the small region above the flat top of the piston and it moves sideways at a high velocity into the combustion chamber. This movement of air is called "squish".

"Swirl" is the angular motion of the fuel/air gaseous mixture in the cylinder above the piston and/or the combustion chamber in the piston. In addition, "shear" refers to a condition where the gas velocity at one point differs significantly from the velocity at a near by point. Because of the velocity gradient, shear forces exist and cause an increase in the turbulence level. In typical prior art pistons a relatively large, relatively shallow combustion chamber is centrally located in the piston. The squish area surrounding the combustion chamber is small and is entirely at the outside perimeter of the piston while the ignition device, such as the spark plug, is normally placed at the center of the cylinder. With the prior art combustion chamber the velocity from squish is low, the shear is low and the turbulence is also relatively low particularly at the spark plug where combustion starts because the spark plug is centrally located and thus the turbulence generated by "squish" and "shear" occurs in the combustion chamber on the outer periphery of the combustion chamber which is at a point the furthest from the spark plug. In addition, the swirl is also taking place about the outer periphery of the combustion chamber at the most remote point from the spark plug. Thus the stability of combustion and flame speed are impaired.

Other prior arrangement, e.g. Alun Thomas' European patent publication No. 0111966, include structures having smaller and deeper combustion chamber recesses in which a baffle spoiling device projects. According to this patent publication, however, the geometries are so configured that the lower end of the spark plug is located in a quiescent zone near the spoiling device (baffle).

The present invention overcomes difficulties of the prior art by providing a combustion chamber which is smaller in area and deeper than in the conventional piston. As a result, the piston has a much greater squish area and hence the squish velocity and the shear forces are much greater.

In addition, the combustion chamber is off-set from the central axis of the cylinder. Thus the combustion chamber is eccentrically located with respect to the piston axis such that ignition of the fuel/air mixture by the ignition device occurs within but on the outer periphery of the combustion chamber. This causes the swirl velocity at the spark plug to be high. Further, because the combustion chamber is off-set in one direction, the squish area is off-set in the opposite direction so that the squish velocity is particularly high in the region of the spark plug. Both of these effects greatly increase the shear and the turbulence at the spark plug.

Finally, the combustion chamber is non-circular in shape. This irregular shape tends to disturb the orderly motion of the swirl thereby creating additional eddies and higher turbulence throughout the combustion region. The effect of the combination of these factors is to increase the turbulence and to increase the flame speed.

Thus it is an object of the present invention to simultaneously reduce undesirable emissions and improve fuel economy of a gaseous fueled engine.

It is another object of the present invention to simultaneously reduce undesirable emissions and improve fuel economy in gaseous fueled engines by increasing the proportion of air compared to the fuel and by increasing the stability of combustion and flame speed by increasing the turbulence of the combustible mixture at the time of ignition and immediately thereafter.

It is also an object of the present invention to provide a combustion chamber in the piston head which is smaller in area and deeper than in a conventional piston thereby providing a much greater squish area and hence squish velocity and thereby increasing the shear velocity.

It is yet another object of the present invention to eccentrically locate a combustion chamber in a head of a piston with respect to the piston axis such that ignition of the fuel/air mixture by the ignition device occurs within but on the outer periphery of the combustion chamber.

It is still another object of the present invention to provide a combustion chamber eccentrically located in the head of a piston with respect to the piston axis and which combustion chamber is non-circular in shape which tends to disturb the orderly motion of the swirl thereby creating additional eddies and higher turbulence throughout the combustion region.

It is also an object of the present invention to provide a combustion chamber eccentrically located in the head of the piston which is generally in the shape of a sector with the apex of the sector being rounded and positioned under an ignition device wherein a sector as used herein has a well-known geometrical shape.

It is yet another object of the present invention to provide a non-circular combustion chamber eccentrically located in the head of a piston with respect to the piston axis and which is generally in the shape of a sector with a squish area on all sides of the combustion chamber and with the largest squish area being adjacent the apex of the sector and nearest the ignition device.

SUMMARY OF THE INVENTION

Thus the present invention relates to an improvement in the gaseous fueled engine having at least a cylinder with an fuel/air mixture intake and combustion product exhaust means, a cylinder head having a flat lower surface enclosing one end of the cylinder, and a piston with a flat top piston head slidably received in the cylinder, the improvement comprising an ignition device extending from the flat lower surface of the cylinder head in the center of the cylinder, and a combustion chamber eccentrically located in the head of said piston with respect to the piston axis such that ignition of the fuel/air mixture by the ignition device occurs within but on the outer periphery of the combustion chamber.

The invention also relates to an improved method of reducing unwanted emissions and improving fuel economy in a gaseous fueled engine having at least a cylinder with an fuel/air mixture intake and combustion products exhaust means, a cylinder head having a flat lower surface enclosing one end of the cylinder and a piston with a flat top piston head slidably received in the cylinder, the improved method comprising the steps of extending an ignition device from the flat lower surface of the cylinder head in the center of the cylinder, and eccentrically locating the combustion chamber in the head of the piston with respect to the piston axis such that ignition of the fuel/air mixture by the ignition device occurs within but on the outer periphery of the combustion chamber.

BRIEF DESCRIPTION OF THE DRAWINGS

These and other objects of the present invention will be more fully disclosed in conjunction with the accompanying drawings in which like numerals represent like components and in which.

DETAILED DESCRIPTION OF THE DRAWINGS

Figure 1:
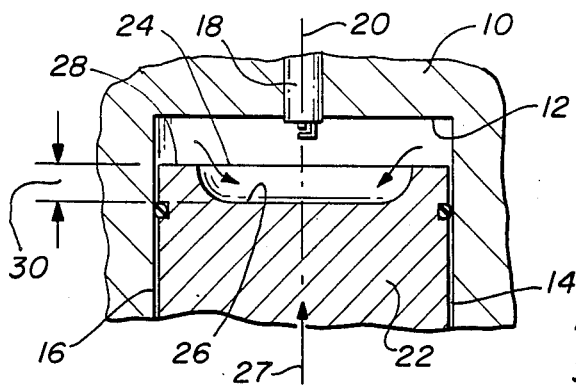
FIG. 1 is a schematic sectional view of the top part of an engine cylinder according to the prior art.

FIG. 1 is a schematic sectional view of the top part of an engine cylinder according to the prior art. Cylinder head 10 has a flat lower surface 12 and side walls 14 and 16 which form the cylinder. Within the cylinder is a spark plug 18 or other ignition device which extends from the flat lower surface 12 of the cylinder head 10 in tee center of the cylinder centered about the cylinder axis 20.

Figure 2:
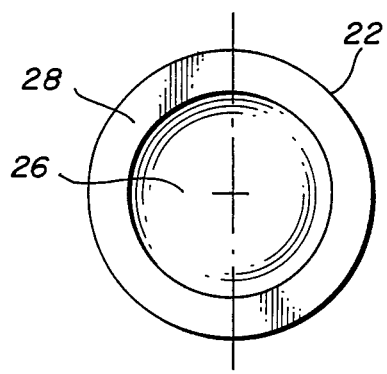
FIG. 2 is a plan view of the prior art piston shown in FIG. 1.

A piston 22 having a flat top piston head 24 is slidably received in the cylinder 10. Piston 22 has a combustion chamber 26 therein for receiving a fuel/air input mixture from a source such as an input port or valve. As the piston 22 moves upwardly as shown by arrow 27 in FIG. 1, the shoulders 28 compress the fuel/air mixture between the shoulders 28 and the lower surface 12 of the cylinder head thus causing a "squish" of the mixture and forcing it into the combustion chamber 26. Thus the flat top areas 28 on the piston 22 are known as "squish areas". Note in FIG. 1 and FIG. 2 that the combustion chamber 26 is relatively large with respect to the total upper surface 24 of piston 22 and that it is relatively shallow and centrally located in the piston 22. The squish area 28 is small and is uniformly and entirely at the outside perimeter of the piston with the spark plug 18 being placed at the center of the piston along the cylinder axis 20. Thus, the squish velocity is low because of the small squish area, the shear is low because of the small velocity gradient and the turbulence is relatively low particularly at the spark plug 18 where combustion starts because spark plug 18 is centrally located. Swirl in the combustion chamber 26 is symmetrical about the axis 20 of cylinder 10 and the velocity of the fuel/air mixture at the center line 20 where the spark plug is located is essentially zero.

Figure 3:
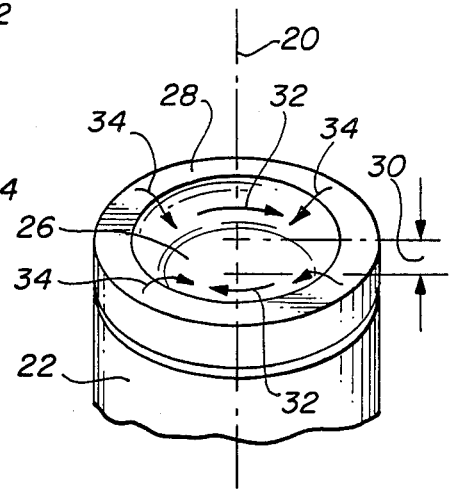
FIG. 3 is a partial isometric view of the upper portion of a prior art piston indicating the combustion chamber, the squish area and the direction of the fuel/air flow within the combustion chamber.

This is more clearly illustrated in FIG. 3 where it can be seen that the squish area 28 is relatively small and is entirely at the outside perimeter of the piston 22. Thus a low squish velocity is obtained. In addition, because of the relatively shallow depth 30 of the combustion chamber 26 the shear velocity is low. Note also that the swirl in the bowl represented by arrows 32 is symmetrical about the piston axis and is concentrated at the outer edge of the combustion chamber 26 thus leaving the velocity at the piston center line axis where the spark plug is located with an essentially zero velocity. Thus in the prior art cylinder, combustion becomes unstable and flame speed is retarded when the mixture is leaned out.

Figure 4:
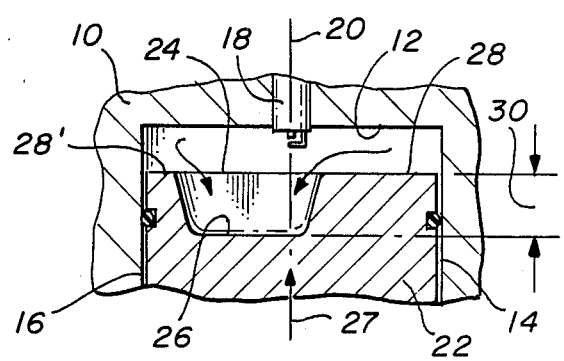
FIG. 4 is a schematic sectional view of the top part of an engine cylinder in accordance with one particular embodiment of the present invention.
Figure 6:
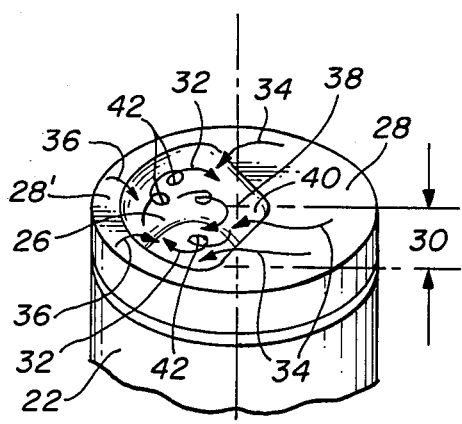
FIG. 6 is a partial isometric view of the top portion of a piston of the present invention illustrating the novel combustion chamber, its eccentric location on the piston head and the direction of the fuel/air flow within the chamber.
Figure 5:
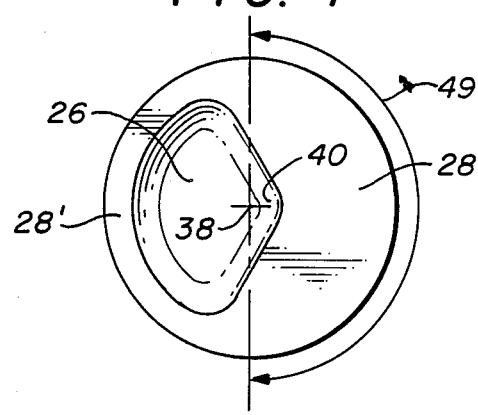
FIG. 5 is a plan view of the novel piston of the present invention illustrating the non-circular shaped combustion chamber and its eccentric positioning with respect to the center axis of the piston.

FIGS. 4, 5 and 6 illustrate the novel piston of the present invention. It has three characteristics which, both singularly and in combination, significantly influence the combustion process by increasing the turbulence level.

First, the combustion chamber is smaller in area and deeper than in a conventional piston as shown by the arrow 30 in FIG. 4 and FIG. 6. As can be seen in FIG. 5, the piston has a local squish area percentage ratio of piston crown area 28 to total piston area for half piston section 49 which is greater than 80% as compared to 25-60% of comparable area 49, for conventional pistons (FIG. 3). The resulting maximum squish velocity is at least 80 meters/second at the edge of the combustion chamber or bowl at this maximum squish location 40. To fully utilize these very high local velocities the spark plug 18 should be located less than 20% of the bore or cylinder diameter away from the maximum squish location 40.

A brief review of squish levels has been undertaken for a number of engines and the results are contained in Table I. Note for a range of bore sizes of central bowl piston engines running at rated speed, with a squish area of 50% and a Piston to Cylinder Head clearance of 1.5 mm, the maximum squish velocity is generally constant at approximately 28 m/sec. occurring at 8 btdc. This occurs because squish velocity is directly influenced by piston speed which within reason is similar for all engines from larger to small. Therefore speed and cylinder or bore size are effectively independent parameters having the maximum squish velocity to be primarily a function of Piston to Cylinder Head clearance at top dead center and the ratio of piston crown area to cylinder area (defined at the Squish Area).

The former, the Piston to Cylinder Head clearance is limited by mechanical constraints. For reference an increase in this clearance from 1.5 to 3.0 mm would reduce the maximum squish velocity by 40%. See Table I.

Therefore it is only the latter, the ratio of piston crown area to cylinder area (squish area) which can effect a dramatic increase in squish velocity. The local maximum squish velocities at the thickest crown section are nearly 4 times greater for this configuration. See Table I.

TABLE I

| ENGINE BORE (mm) | SPEED (rpm) | P/H (mm) | SQUISH AREA (% cylinder area) | MAX SQUISH VELOCITY (m/sec) |
| --- | --- | --- | --- | --- |
| 80 | 6000 | 1.5 | 50 | 28.3 (FIG. 3) |
| 150 | 1800 | 1.5 | 50 | 27.9 (FIG. 3) |
|  | 1800 | 3.0 | 50 | 16.7 (FIG. 3) |
|  | 1200 | 1.5 | 50 | 18.6 (FIG. 3) |
|  | 1800 | 1.5 | 89 | 107.0 (FIG. 5) |
| 210 | 1200 | 1.5 | 50 | 28.4 (FIG. 3) |
| 250 | 1000 | 17.0 | 30 | 2.5 (FIG. 3) |

As a result, the piston has a much larger squish area 28 and thus the squish velocity and the shear velocities are much greater than those obtained with the prior art piston.

In addition, the combustion chamber is eccentrically located with respect to the piston axis 20 such that ignition of the fuel by the spark plug 18 occurs within but on the outer periphery of the combustion chamber 26 as indicated by the point 38. Thus, the swirl in the combustion chamber 26 is offset with respect to the center line of the piston and passes essentially directly under point 38 which is the center line of the cylinder at which point the spark plug 18 is located. With the spark plug 18 located on the cylinder center axis 20, as proposed, (less than 20% of the bore diameter away from the bowl edge 40) and the combustion chamber eccentrically located with respect to the cylinder center line axis 20, the swirl velocity in the vicinity of the spark plug 18 is high. Further, because the combustion chamber 26 is offset to the left in FIGS. 4, 5 and 6 the squish area 28 is offset in the opposite direction on the right with a large squish area 28 provided. The squish velocity is particularly high as it forces the fuel/air mixture into the combustion chamber as indicated by arrows 34 immediately in the vicinity of spark plug 18 at point 38. Thus because the combustion chamber is smaller in area and deeper than in a conventional piston and because the combustion chamber is offset with respect to the center line axis 20 of the cylinder 10, both the shear and the turbulence at the spark plug 18 are greatly increased.

Finally, it will be noted that the combustion chamber 26 is non-circular in shape and is in fact generally in the shape of a sector with the apex or edge 40 of the sector being rounded and positioned under the spark plug 18. Thus a squish area 28 and 28' is on all sides of the combustion chamber with the largest squish area 28 being adjacent the maximum squish location 40 nearest the spark plug 18.

Because the bowl is non-circular in shape it tends to disturb the orderly motion of the swirl as indicated by arrows 32 in FIG. 6 thereby creating additional eddies 42 and thus higher turbulence through out the combustion region and combustion chamber 26.

Thus the effect of each of these factors, that is: (1) a combustion chamber having a smaller area and being deeper than a conventional piston, (2) the eccentric location of the combustion chamber with respect to the axis of the cylinder and (3) the non-circular shape of the combustion chamber, is to tend to increase the turbulence and to increase the flame speed. In one test, for example, the time for combustion from 10% to 90% burning was equal to 45 crank degrees for the conventional piston and to only 30 crank degrees for the offset combustion chamber piston of the present invention.

Figure 7:
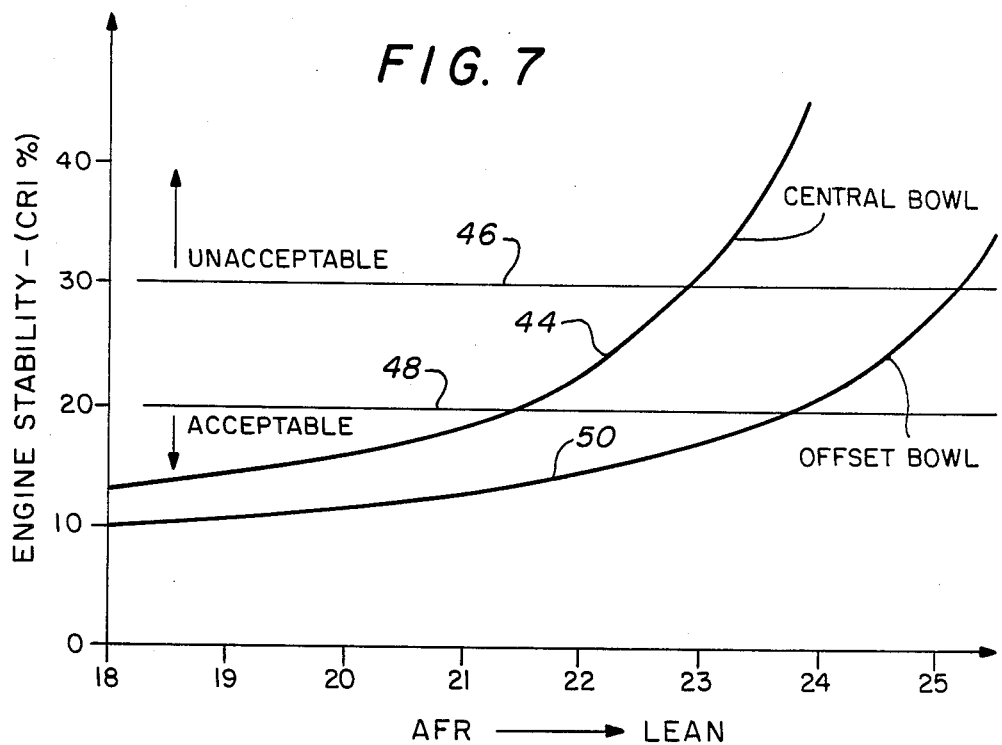
FIG. 7 is a graph of engine stability versus fuel/air ratio comparing the prior art piston having a centrally located combustion chamber with the piston of the present invention having an eccentrically located combustion chamber.

The improved performance of an engine with the eccentrically located combustion chamber in the piston is pronounced. First, the degree to which the engine can be leaned out with good stability is improved from a fuel/air ratio of about 23:1 to about 25:1. See FIG. 7 which is a graph of engine stability with a change in fuel/air ratio, the lean mixture being to the right along the ordinate in FIG. 7. Thus curve 44 represents the operation of a prior art engine having a combustion chamber centrally located in the piston. Note that at a fuel/air ratio mixture of about 23:1, the engine operation becomes unstable since curve 44 rises above line 46 which indicates the point of instability or unacceptable operation. Operation below line 48 is acceptable while operation between lines 46 and 48 is marginal. Note that with the prior art piston having a centrally located combustion chamber that acceptable operation occurs to a mixture of approximately 21½:1. With the piston of the present invention having the off-set combustion chamber, acceptable operation occurs up to a fuel/air ratio of approximately 24:1. This is represented by curve 50.

Figure 8:
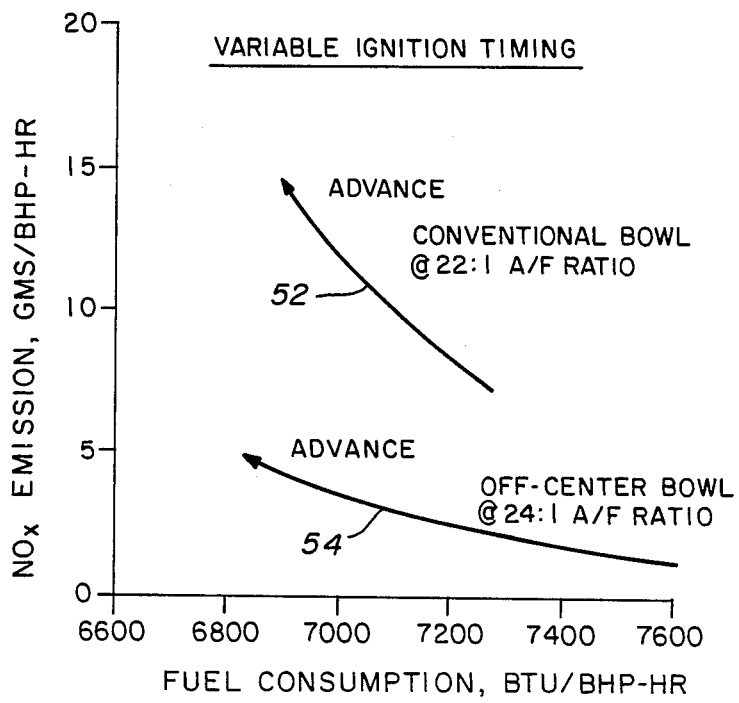
FIG. 8 is a comparison of $NO_x$ emissions versus fuel consumption of an engine having a conventional piston with the combustion chamber centrally located and an engine having a piston of the present invention which has an eccentrically located combustion chamber.

Further, the $NO_x$ emission level and fuel consumption are significantly reduced when operating at fuel/air ratios adjusted as lean as possible while maintaining acceptable combustion stability. Typical results are shown in FIG. 8 which compares an engine with a 22:1 fuel/air ratio (curve 52) for a conventional piston with an engine having a fuel/air ratio of 24:1 (curve 54 in FIG. 8) using the piston of the present invention having the eccentrically placed combustion chamber. Note the greatly reduced $NO_x$ emissions with the eccentrically located combustion chamber of the present invention.

Thus there has been disclosed a novel piston having an eccentrically located combustion chamber which is smaller in area and deeper than in a conventional piston, which is eccentrically located with respect to the axis of the cylinder and which is non-circular in shape. The smaller area and deeper construction increases the squish velocity and the shear velocity. The eccentric location of the combustion chamber with the spark plug being located at the center of the cylinder causes the swirling velocity of the fuel mixture to be high in the vicinity of the spark plug. In addition, the offset location of the combustion chamber causes the squish velocity to be particularly high in the region of the spark plug which therefore greatly increases the shear and the turbulence at the spark plug which is desirable.

Finally, because the combustion chamber is non-circular in shape, it tends to disturb the orderly motion of the swirl thereby creating additional eddies and higher turbulence through out the combustion region. These features enable a greatly improved performance of the engine.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

I claim:

1. In a gaseous fueled engine having at least a cylinder with an fuel/air intake and combustion product exhaust means, a cylinder head having a flat lower surface enclosing one end of said cylinder, and a piston with a flat top piston head slidably received in said cylinder, the improvement comprising:
   a. an ignition device extending from said flat lower surface of said cylinder head in the center of said cylinder, and
   b. a baffleless combustion chamber eccentrically located in the head of said piston with respect to said piston axis such that ignition of said fuel/air mixture by said ignition device occurs within but on the outer periphery of said combustion chamber.

2. The improved engine of claim 1 wherein said combustion chamber is entirely non-circular in shape thereby creating eddies and high turbulence of said fuel throughout said combustion chamber.

3. The improvement of claim 1 wherein said combustion chamber in said piston head is positioned with respect to said ignition device such that said ignition device is located a distance less than 20% of the cylinder diameter away from the nearest edge of said combustion chamber.

4. The improved engine of claim 2 wherein said non-circular combustion chamber is generally in the shape of a sector less than semicircular, with the apex of the sector being rounded and positioned under said ignition device.

5. The improved engine of claim 2 in which said piston has a local squish area percentage ratio of piston crown area to total piston area for a half section of the head of said piston which is greater than 80 percent.

6. The improved engine of claim 2 wherein the highest turbulence of said fuel occurs essentially directly beneath said ignition device.

7. The improved engine of claim 4 comprising a fuel/air mixture squish area on all sides of said combustion chamber, the largest squish area being adjacent the apex of said sector and nearest said ignition device.

8. The improved engine of claim 4 in which said piston has a local squish area percentage ratio of piston crown area to total piston area for a half section of the head of said piston which is greater than 80%.

9. The improved engine of claim 7 wherein said ignition device is a spark plug.

10. An improved method of reducing unwanted emissions and improving fuel economy of a gaseous fueled engine having at least a cylinder with an fuel/air mixture intake and combustion product exhaust means, a cylinder head having a flat lower surface enclosing one end of said cylinder, and a piston with a flat top piston head slidably received in said cylinder, the improved method comprising the steps of:
    a. extending an ignition device from said flat lower surface of said cylinder head in the center of said cylinder, and
    b. eccentrically locating a baffleless combustion chamber in the head of said piston with respect to said piston axis such that ignition of said fuel by said ignition device occurs within but on the outer periphery of said combustion chamber.

11. The improved method of claim 10 further comprising the step of forming said combustion chamber entirely of a non-circular shape thereby creating eddies and high turbulence of said fuel throughout said combustion chamber.

12. The improved method of claim 10 further comprising the step of positioning said combustion chamber with respect to said ignition device such that said ignition device is located a distance less than 20% of the cylinder diameter away from the nearest edge of said combustion chamber.

13. The improved method of claim 11 further comprising the steps of:
    a. forming said combustion chamber in the general shape of a less than semicircular sector,
    b. rounding the apex end of said sector shaped combustion chamber, and
    c. positioning said combustion chamber on said piston such that said apex of said sector is under said ignition device.

14. The improved method of claim 11 further comprising the step of providing in said head of said piston, a local squish area percentage ratio of piston crown area to total piston area for a half section of the head of said piston which is greater than 80%.

15. The improved method of claim 11 wherein said eddies and turbulence are greatest immediately below said ignition device.

16. The improved method of claim 13 further comprising the step of forming a fuel/air mixture squish area on all sides of said combustion chamber, the largest squish area being adjacent the apex of said sector and nearest said ignition device.

17. The improved method of claim 13 further comprising the step of providing in said head of said piston a local squish area percentage ratio of piston crown area to total piston area for a half section of the head of said piston which is greater than 80%.

18. An improved method of claim 16 further comprising the step of using a spark plug as said ignition device.

* * * * *